(12) United States Patent
Senzui et al.

(10) Patent No.: US 7,310,088 B2
(45) Date of Patent: Dec. 18, 2007

(54) INPUT OPERATION DEVICE

(75) Inventors: Akira Senzui, Tokyo (JP); Kota Yamazaki, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 447 days.

(21) Appl. No.: 10/396,366

(22) Filed: Mar. 26, 2003

(65) Prior Publication Data

US 2003/0184517 A1    Oct. 2, 2003

(30) Foreign Application Priority Data

Mar. 26, 2002 (JP) ............................. 2002-087219
Apr. 1, 2002 (JP) ............................. 2002-098695

(51) Int. Cl.
*G09F 3/041* (2006.01)
(52) U.S. Cl. .................... 345/173; 178/18.01
(58) Field of Classification Search ........ 345/173–183; 178/18.01, 18.02
See application file for complete search history.

(56) References Cited

U.S. PATENT DOCUMENTS

| | | | | |
|---|---|---|---|---|
| 4,349,712 A | * | 9/1982 | Michalski | 200/513 |
| 4,564,079 A | * | 1/1986 | Moore et al. | 178/18.03 |
| 4,598,181 A | * | 7/1986 | Selby | 200/5 A |
| 5,506,375 A | * | 4/1996 | Kikuchi | 178/18.07 |
| 5,673,066 A | * | 9/1997 | Toda et al. | 345/157 |
| 5,861,874 A | * | 1/1999 | Joto | 345/173 |
| 6,067,005 A | * | 5/2000 | DeVolpi | 338/47 |
| 6,437,772 B1 | * | 8/2002 | Zimmerman et al. | 345/160 |
| 6,532,003 B2 | * | 3/2003 | Nagao | 345/173 |

FOREIGN PATENT DOCUMENTS

| | | |
|---|---|---|
| CN | 2398676 Y | 9/2000 |
| JP | 9-305296 | 11/1997 |

* cited by examiner

*Primary Examiner*—Richard Hjerpe
*Assistant Examiner*—Kevin M Nguyen
(74) *Attorney, Agent, or Firm*—Rader, Fishman & Grauer PLLC

(57) ABSTRACT

An object of the present invention is to provide a novel input operation device in which multi-functionality corresponding to higher functionality of electrical equipment can be achieved along with tactile functionality suitable as a man-machine interface. An input operation device (1) is provided with a switching portion (3) under a coordinate operation portion (2) that has dome-shaped coordinate operation portions (4a) and (5a) that are deformable due to operation press forces. An operator can perceive the deformation of the coordinate operation portion (2) during a coordinate operation as tactile operational feel. Further, an input operation of the switching portion (3) is performed if a large operational press force is applied, and therefore it is possible for the operator to perform the coordinate operation and the input operation while perceiving differences in the operation feel, which correspond to differences in an operation press force, and an erroneous input operation in the switching portion (3) can also be reliably prevented. The coordinate operation can be performed provided that the operation of pressing spherical surface similar to trackball operation is imparted to the dome-shaped coordinate operation portions (4a) and (5a), and it therefore extremely superior in functionality as well.

23 Claims, 11 Drawing Sheets

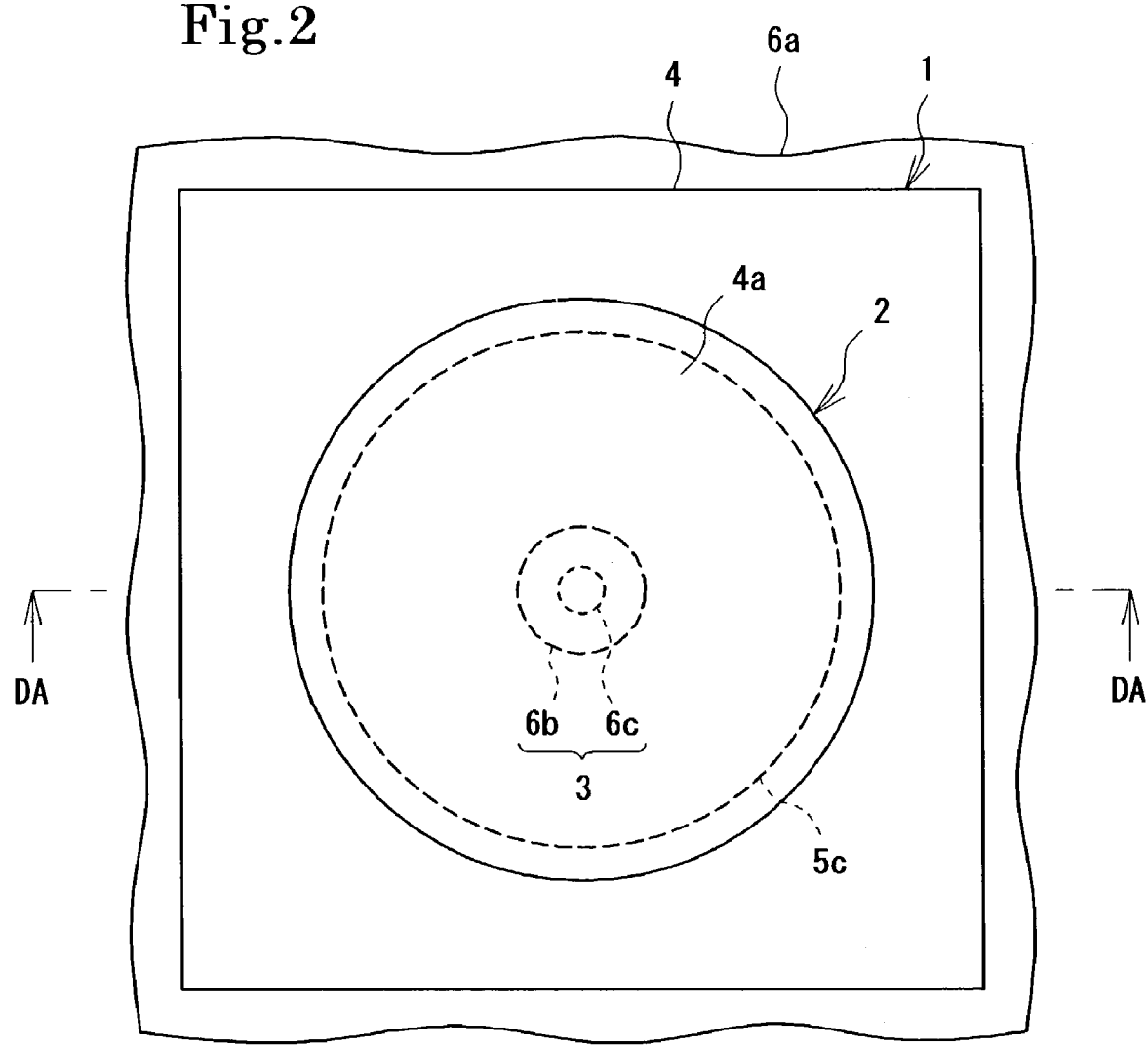

INPUT OPERATION DEVICE

BACKGROUND OF THE INVENTION

1. Field of the Invention

The present invention relates to an input operation device utilized as a man-machine interface of electrical equipment such as personal computers, Personal Digital Assistants (PDAs), portable telephones, game devices, and car navigation devices.

2. Description of the Related Art

Pointing devices such as mice, trackballs, and touch panels are known as input operation devices provided to electrical equipment. Of those devices, trackballs and touch panels (touch pads) are advantageous, as compared to mice and the like, which require an operation space. For example, trackballs and touch panels may have unity with the equipment because they are built into the equipment itself. Focusing on the presence or absence of multi-functionality corresponding to the day-to-day pursuit of making electrical equipment more highly functional, the conventional trackballs have only a function of performing coordinate operations in which an indicator mark, such as a pointer, displayed on a screen of a display device is freely moved on the screen. It is necessary to conduct a key operation utilizing another input device, like an enter key of a keyboard, to perform input operations after moving the pointer to a predetermined position. Coordinate operations and input operations cannot both be completed by using only a trackball. Further, although coordinate operations are performed with conventional touch panels by touching the surface thereof using a finger, input operations are generally achieved by a computer software driver. For example, if the touch panel surface is tapped twice in succession, the driver recognizes the tapping as an input operation. It can therefore be said that the touch panel is superior to the trackball in that two functions, coordinate operations and input operations, can be achieved by a single input operation device. However, even though multi-functionality can be achieved by using computer software, the operational feel obtained from the touch panel by an operator who performs rubbing operations or tapping operations on the touch panel are always unchanging, hard, uniform feel.

Therefore, there is a need in the art for a pointing device having good operation as a man-machine interface.

SUMMARY OF THE INVENTION

In light of conventional devices and techniques like those above, an object of the present invention is to provide a novel input operation device suitable as a man-machine interface in which multi-functionality corresponding to higher functionality of electrical equipment can be achieved along with tactile operability.

In order to accomplish these and other objects, the present invention is provided with the following technical concepts. That is, an input operation device of the present invention is structured by a coordinate operation device and a switching device. The coordinate operation device is one provided with a flexible operation substrate having a conductive coordinate detection portion, and a base substrate having a conductive coordinate detection portion, with both of the coordinate detection portions disposed face to face in an electrically insulating state. The coordinate operation device performs coordinate operations in accordance with an input signal being generated when both of the coordinate detection portions are in conductive contact with each other due to deformation of the operation substrate following pressing operations. On the other hand, the switching device is formed below the base substrate, and performs input operations by generating input signals due to pressing operations through the coordinate operation device. With the input operation device of the present invention, which is provided with the coordinate operation device and the switching device, the flexible operation substrate deforms due to pressing operations, and tactile operability is imparted to an operator, even if either coordinate operation or input operation is performed. Further, coordinate operations and input operations can be clearly distinguished by the strength of the press force applied to the coordinate operation device. The operator can therefore separate coordinate operations and input operations while perceiving different operation feel with the strength of the press force. In accordance with the present invention as described above, multi-functionality corresponding to higher functionality of electrical equipment can be achieved along with tactile operability suitable as a man-machine interface.

In the input operation device of the present invention, a resin spacer is disposed between a rear surface of the base substrate and the switching device, the resin spacer having an upper surface portion that conforms to a surface shape of the rear surface.

In accordance with the present invention, the shape of the base substrate that receives the pressing operations can be maintained by the resin spacer. Further, the pressing operations with respect to the switching device means can be reliably transmitted through the resin spacer when performing input operations. The resin spacer itself is displaced in the press direction when performing the input operations, and therefore the sensation when the resin spacer is displaced can be perceived as the tactile operation feel of the input operations by the operator.

In the input operation device of the present invention, the resin spacer and the base substrate are integrated through a joining operation.

The deformation of the base substrate that receives the pressing operations can be prevented according to the present invention. Further, there is no gap between the base substrate and the resin spacer with the present invention, and therefore the pressing operation force, which is applied to the base substrate in order to perform the input operations by the switching device, can be transmitted directly to the switching device through the resin spacer, and the operability of the input operations can be increased. In addition, the input operation device of the present invention can be assembled by taking the base substrate with the integrated resin spacer as a unit, and therefore the workability during assembly can also be increased.

In the input operation device of the present invention, the resin spacer is formed as a divided body composed of a ring-shaped circumferential spacer having a guide hole, and a central spacer that passes through the guide hole, and the switching device is provided below the central spacer.

In accordance with the present invention, operation press forces can be reliably transmitted to the switching means by the central spacer that is displaced within the guide hole.

The present invention, with the resin spacer taken as the divided body composed of the circumferential spacer and the central spacer, can also include another switching device, below the circumferential spacer, which generates an input signal by the operational pressing through the coordinate operation device.

According to the present invention, in addition to input operations by the switching device below the central spacer, input operations of the other switching device under the circumferential spacer can also be performed, and therefore multi-functionality of electrical equipment can be achieved by a plurality of different input operations. In this case, the other plural switching devices to be provided below the circumferential spacer can be disposed along the circumferential direction of the circumferential spacer.

In the present invention provided with the other switching device below the circumferential spacer, the circumferential spacer can be formed as divided bodies composed of a plurality of portions along the circumferential direction.

Input operations can be performed by the other switching device for each portion of the divided circumferential spacer, and therefore, input errors whereby an erroneous input in which the other plural switching devices provided below the circumferential spacer are input simultaneously, can be prevented.

In the input operation device of the present invention, a portion in which the coordinate detection portions of the operation substrate and the base substrate are formed is formed as a dome-shaped coordinate operation portion.

A central portion (apex) of the coordinate detection portion can easily and tactually perceived in accordance with the present invention compared to cases in which the coordinate detection portions of the operation substrate and the base substrate are formed has a planar shape. Coordinate operations to multiple and random directions with the apex of the dome-shaped coordinate operation portion as a center can therefore be performed intuitively. At a curved and inclined portion other than the apex of the dome-shaped coordinate operation portion, the current position of the coordinate operation portion can be found tactually based on the inclination direction and the inclination angle obtained through the operation of the finger. Additionally, high operability can therefore be achieved. Further, coordinate operations are possible by pressing operations so that a spherical surface of the dome-shaped coordinate operation portion is rubbed, similarly to the operations for rotating a trackball, in accordance with the present invention having the aforementioned structure. It is, therefore, possible to artificially achieve the superior operation feel peculiar to trackball operation even with the input operation device of the present invention, and superior operability can also be obtained in this point as well. With the present invention, it is not necessary to make a device structure for achieving such a high operability, in which the device thickness is large like that of a trackball with a similar method of operation, and therefore the demand to make electrical equipment, in which the input operation device of the present invention is mounted, thinner can also be satisfied. This advantage becomes an extremely large merit for input operation devices mounted in portable equipment, such as notebook type personal computers, portable telephones, and PDAs, with which the demand for making the overall equipment smaller is especially strong. Note that, not only the overall coordinate operation portion is formed into a dome shape in the present invention, but a portion of the coordinate operation portion may also have a dome shape.

Further, the dome-shaped coordinate operation portion is not always required to extrude upward from the flat, general surface in the operation substrate and the base substrate in a manner that is formed into a convex shape with respect to the operator. A concave shape recessed downward from the general surface may also be used.

In the input operation device of the present invention, a clicking sensation is generated by pressing operation of the switching device.

In accordance with the present invention, it is possible for the operator to tactually perceive the performance of input operations by the switching device by the generation of the clicking sensation, and reliable operability can be obtained.

A conical spring shape contact member or a tact switch can be utilized as the switching device as described above, which generates the clicking sensation. Further, a membrane switch can be utilized as the switching device, for example, for electrical equipment for which the clicking sensation in the input operations is undesirable.

The input operation device of the present invention further includes a direction control device for setting a movement direction of an operation object element for coordinate operation, in an operation point formed by conductive contact between the coordinate detection portions of both of the operation substrate and the base substrate.

Multiple operation points are formed if the coordinate detection portions of the operation substrate and the base substrate are brought into contact with each other over their entire surfaces. The movement direction of the operation object element for coordinate operation can be set in each of the operation points in accordance with the present invention, and therefore the operation object element; an operation indicator such as a cursor or a pointer, a scrolling screen, or the like can be made to move accurately.

The direction control device can be structured as a device in which, if the operation point is formed, the operation object element is made to move in the movement direction set in the operation point until intermittent conductive contact is released in the operation point.

In performing coordinate operations of an operation object element such as a pointer by using a trackball or a touch pad, numerous rotational operations of the trackball or numerous rubbing operations of the touch pad often become necessary in order to move the pointer to a target location. Further, for cases in which these rotational operations or rubbing operations are thus repeated many times, it is difficult to always make the pointer move continuously in a fixed direction. Normally, the meandering pointer is moved to the target position while correcting the direction for each operation. Thus, operators often feel fatigued because the operations are complex. But in accordance with the present invention, however, the operation object element can be accurately moved in a predetermined movement direction by static operation in which only pressing operations are continuously applied in order to form an operation point in the coordinate detection portion. Movement operations can be performed with ease.

The input operation device of the present invention further includes a speed control device for setting a movement speed of an operation object element for coordinate operation in an operation point formed by conductive contact between the coordinate detection portions of both of the operation substrate and the base substrate.

Multiple operation points are formed if the coordinate detection portions of the operation substrate and the base substrate are brought into contact with each other over their entire surfaces. The movement speed of the operation object element for coordinate operation can be set in each of the operation points in accordance with the present invention. Thus, the movement speed of the operation object element is set individually for each operation point, and the operation of the coordinate operations can be increased. An operation object element may include an operation indicator such as a cursor or a pointer, a scrolling screen, or the like.

The input operation device of the present invention further includes a speed control device for changing the movement speed of the operation object element for coordinate operations in response to a separation distance from an operation starting point, with the operation point formed by conductive contact between the coordinate detection portions of both of the operation substrate and the base substrate set as the operation starting point.

In accordance with the present invention, it is possible to perform movement of the indicator mark such as a pointer or cursor, or screen scrolling speed by analog operation feel, and in addition, the operability of the coordinate operations can be increased.

The speed control device can be structured as a device in which, if the operation point is formed, the operation object element is made to move at the movement speed set in the operation point until intermittent conductive contact is released in the operation point.

In accordance with the present invention, the operation object element can be constantly moved in a predetermined movement direction at the speed set in the operation point by static operation, in which only pressing operations are continuously applied in order to form the operation point in the coordinate detection portion. Movement operations can be performed with ease.

The input operation device of the present invention further includes an operation point setting device for setting one operation point as an operation starting point if multiple operation points are formed by conductive contact between the coordinate detection portions of both of the operation substrate and the base substrate.

In accordance with the present invention, even if multiple operation points are formed by pressing operations for performing coordinate operations, one of the operation points is set as the operation starting point by an operation point setting means, and therefore, coordinate operations can be performed accurately even if the applied force or finger size differs among operators.

The input operation device of the present invention further includes an invalidation control device that invalidates coordinate operation if multiple operation points are formed by the coordinate detection portion of the operation substrate and the coordinate detection portion of the base substrate contacting at a vertical upper position of the switching device due to pressing operations.

In accordance with the present invention, input operations can be performed reliably in a state where the indicator mark such as a pointer or cursor, which has been made to move by coordinate operations, is stopped in a predetermined position.

The input operation device of the present invention further includes an operation mode switching device for switching to a predetermined input operation, coordinate operations that are performed by conductive contact between the coordinate detection portions of both of the operation substrate and the base substrate, by generating an input signal in the switching device.

In accordance with the present invention, the coordinate operation device not only can be used for coordinate operations, but also can be used for other input operations corresponding to the operation method, and additional multi-functionality can be achieved.

The direction control device, the speed control device, the operation point setting device, the invalidation control device, and the operation mode switching device of the present invention as described above can be realized by, for example, a processing unit that includes, but is not limited to, a microcomputer that performs coordinate operation processing by implementing a predetermined computer program. The direction control device, the speed control device, the operation point setting device, the invalidation control device, and the operation mode switching device may each be realized by different processing units with the present invention, and all of the devices may also be realized by using one processing unit. Some of the devices may also be realized by using one processing unit.

The present invention is not limited to what has been described above and the objects, advantages, features and utilities of the present invention will become clearer by the following description with reference to the accompanying drawings. Also, it should be understood that all the appropriate variations made without departing from the scope and spirit of the present invention be encompassed within the scope of the present invention.

BRIEF DESCRIPTION OF THE DRAWINGS

In the accompanying drawings:

FIG. 2 is a plan view of the pointing device of FIG. 1;

FIG. 3A is a schematic exploded diagram of the operation substrate and the base substrate, and FIG. 3B is a schematic diagram showing a wiring pattern of a coordinate operation region when the operation substrate and the base substrate are combined;

DETAILED DESCRIPTION OF THE PREFERRED EMBODIMENTS

Figure 1:
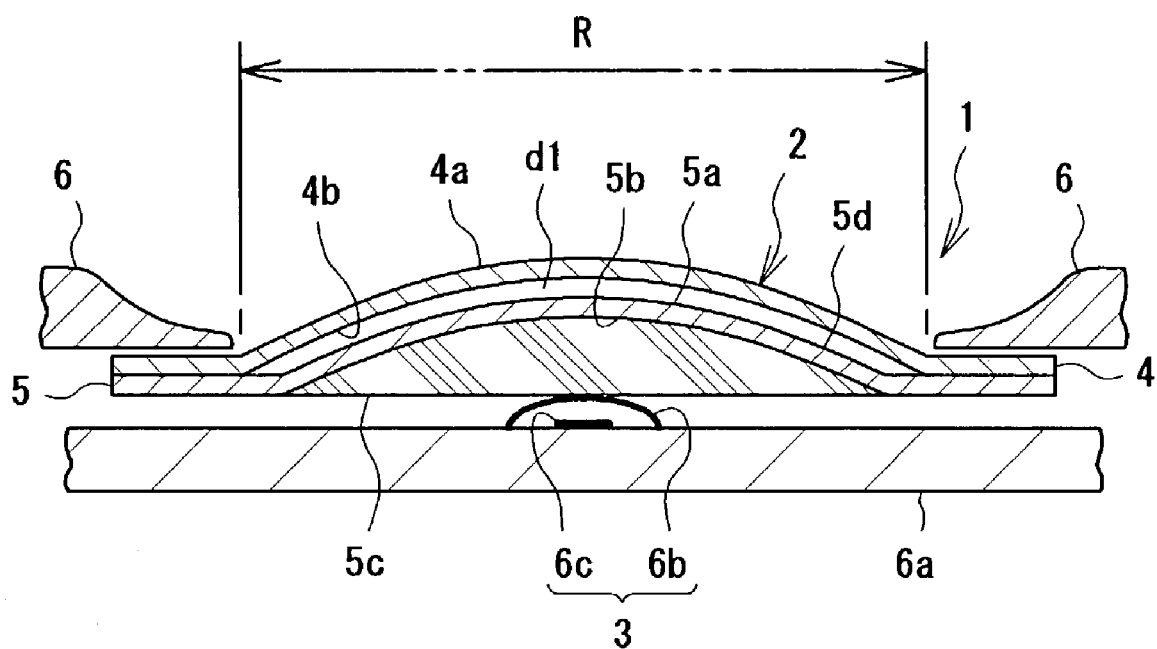
FIG. 1 is a cross sectional diagram taken along the line DA-DA of FIG. 2, which shows a pointing device in accordance with Embodiment 1 of the present invention.

Embodiments of the present invention will be explained below with reference to the diagrams. Note that explanations for portions repeated in each of the embodiments are omitted, except when specific references are made.

Embodiment 1 (FIG. 1 to FIG. 6)

A pointing device 1 as an "input operation device" of this embodiment is structured by providing a switching portion 3 as a "switching device" under a coordinate operation portion 2 as a "coordinate operation device".

The coordinate operation portion 2 has a structure in which a substrate 4 and a base substrate 5 are laminated together. The substrate 4 and a base substrate 5 are both flexible. A dome-shaped coordinate operation portion 4a that bulges upward, that is, toward an operator, is provided in the operation substrate 4, and the entirety becomes a coordinate operation region R in this embodiment. A substantially similarly shaped dome-shaped coordinate operation portion 5a having a slightly smaller radius of curvature than that of the dome-shaped coordinate operation portion 4a is provided in the base substrate 5 and the entirety becomes a coordinate operation region R as described above. The dome-shaped coordinate operation portion 4a and 5a are mutually separated with a gap opened on the order of d1, and are mutually electrically insulated. The dome-shaped coordinate operation portion 4a is substantially concentric with the dome-shaped coordinate operation portion 5a. The gap d1 within a range of 0.05 mm to 1 mm in terms of operability and input sensitivity is within the scope of the invention. The gap d1 within a range of 0.1 mm to 0.5 mm is also within the scope of the invention.

The operation substrate 4 and the base substrate 5 are formed by using a thin, light, flexible substance. A thin, light, flexible substance may include, but is not limited to, a resin film. The thin, light, flexible substance is effective in making equipment into which the pointing device 1 mounted thinner and lighter. Specifically, thinly formed resin films of resin materials that can be utilized as the resin film include, but are not limited to, polyethylene terephthalate resin, polyethylene naphthalate resin, polycarbonate resin, polyamide resin, polypropylene, resin, polystyrene resin, polyurethane resin, polyvinyl resins, fluorine resins, polyacetate resin, polyimide resin, acrylic resin, and thermoplastic elastomers, and the like. The operation substrate 4 and the base substrate 5 are given an integral structure by mutually joining outside portions of the dome-shaped coordinate operation portions 4a and 4b by using a joining means that include, but are not limited to, bonding by heat sealing, ultrasonic sealing, welding, or adhesive, or adhesion by double sided tape, and the like.

A resin spacer 5c is provided in a rear surface 5b of the dome-shaped coordinate operation portion 5a of the base substrate 5. The resin spacer 5c is integrated by joining it to the base substrate 5. A top surface of the resin spacer 5c and the rear surface of the dome-shaped coordinate operation portion 5a are therefore bonded. Operation press forces applied during an input operation to the switching portion 3 can therefore be transmitted directly by thus eliminating play, and the input operation can be reliably performed.

The resin spacer 5c retains the shape of the base substrate 5 and the shape of the operation substrate 4 of the integrated structure with the base substrate 5, and further, reliably press the switching portion 3. Thermoplastic resins, thermosetting resins, synthetic rubbers, and thermoplastic elastomers can therefore be used as specific examples of such substances. Note that that synthetic rubbers and thermoplastic elastomers have a hardness sufficient to reliably transmit operation press forces to the switching portion 3. In addition to in-mold integral formation of the resin spacer 5c and the base substrate 5, such as co-injection molding and insertion molding, joining means such as bonding by heat sealing, ultrasonic sealing, welding, or adhesive, or adhesion by double sided tape, or the like, can be utilized as a method of joining with the base substrate 5. A mutually joined integrated structure can thus be achieved. Note that, among these, the in-mold integral formation method, which does not require a joining step, is within the scope of the invention.

Figure 3A:
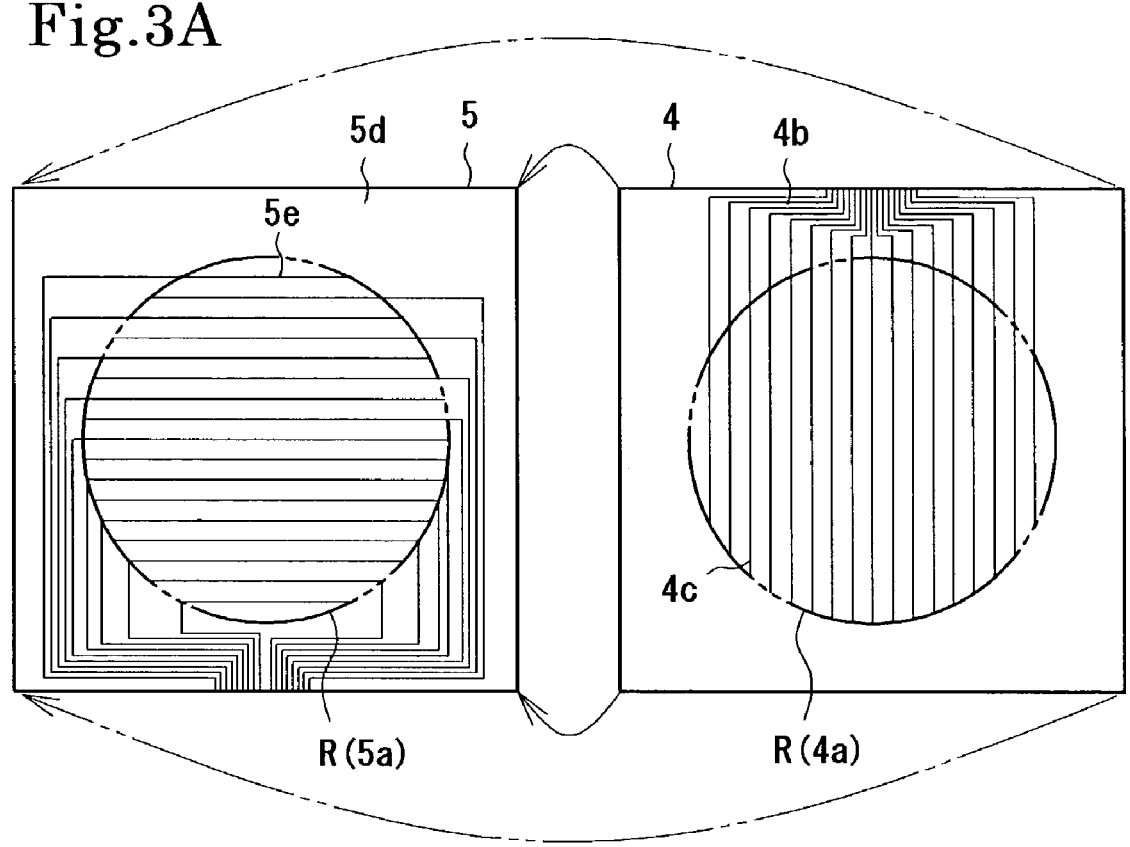
FIGS. 3A and 3B are explanatory diagrams showing an operation substrate and a base substrate, and specifically.
Figure 3B:
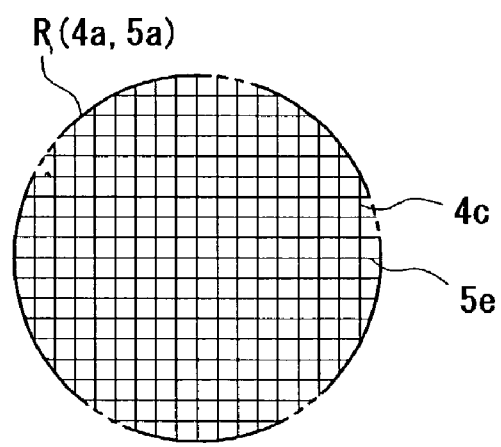

A matrix pattern coordinate detection portion is formed in the coordinate operation region R in which the operation substrate 4 and the base substrate 5 are joined. That is, an electrode pattern 4c is formed as a vertical stripe-shaped "coordinate detection portion" in the rear surface 4b of the operation substrate 4, and an electrode pattern 5e is formed as a horizontal stripe shaped "coordinate detection portion" in a front surface 5d of the base substrate 5, as shown in FIG. 3A. If the operation substrate 4 and the base substrate 5 are then joined as discussed above, a matrix pattern coordinate detection portion is formed, in an insulating state through the gap d1, in the coordinate operation region R as shown in FIG. 3B. Note that the outside portion of the coordinate operation region R is insulated, by using an adhesive if joining is performed by an adhesive, by using a double sided tape if joining is performed by a double sided tape, and by an insulator if joining is performed by any other method, so that the electrode patterns 4c and 5e do not mutually conduct in the outside of the coordinate operation region R. The electrode patterns 4c and 5e can be formed by metallic foil etching, or applying a conductive ink, or the like.

The switching portion 3 is structured in this embodiment by a metallic conical spring contact 6b, like an inverted bowl shaped stainless thin plate surface-mounted to a substrate 6a within a frame 6 of the equipment to which the pointing device 1 is mounted, and a contact 6c formed on the substrate 6a. The switching portion 3 deforms along with a clicking sensation in the conical spring contact if an input operation press force is applied to the switching portion 3, and is brought into contact with the contact 6c of the substrate 6a. An input operation can thus be performed by the switching portion 3, separate from the input operation by the coordinate operation portion 2.

The input load of the switching portion 3, which is at the metallic conical spring contact 6b is approximately 3 N, which is larger than the conductive load of the electrode patterns 4c and 5e in the coordinate operation portion 2 that is on the order of 0.2 N. Erroneous input of the switching portion 3 by coordinate operation press forces applied to the coordinate operation portion 2 can therefore be prevented.

The switching portion 3 of this embodiment is structured by the metallic conical spring contact 6b, but may also be structured by a conical spring contact made by an inverted bowl shaped hard resin film, or a tactile switch, that forms a conductive contact on a surface opposing the contact 6c, or any elastic structure. With this structure, a clicking sensation can also be obtained. Further, the switching portion may also be structured by a membrane switch or the like in the case where an accompanying clicking sensation is not needed.

Figure 4:
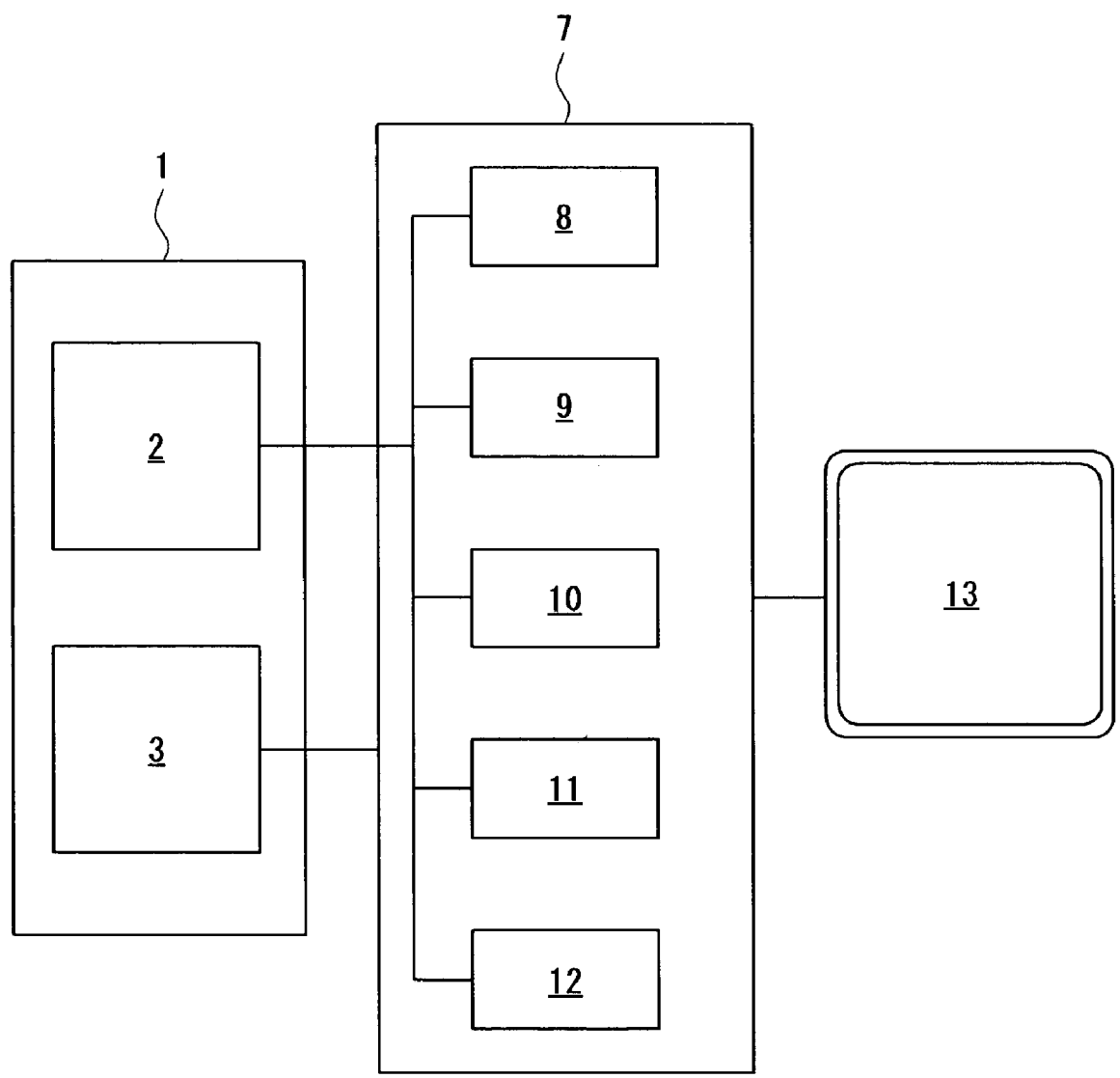
FIG. 4 is a functional block diagram of the pointing device of FIG. 1.

A functional block diagram of this embodiment is shown in FIG. 4, and this is explained next.

The coordinate operation portion 2 and the switching portion 3 of the pointing device 1 are connected to a microcomputer 7. Coordinate operation control programs, specifically, a operation point setting program 8, an invalidation control program 9, a speed control program 10, a direction control program 11, and an operation mode switching program 12 are stored in a memory of the microcomputer 7. A coordinate operation is controlled by executing the programs 8 to 12 by a central processing unit of the microcomputer 7. The microcomputer 7 that executes the programs 8 to 12 thus functions as an "operation point setting device", an "invalidation control device", a "speed control device", a "direction control device", and an "operation mode switching device" of the present invention in this embodiment. Operation of an "operation object element" such as an indication sign like a cursor, a pointer, etc., a scrolling screen, or the like formed by the coordinate operation control program is shown in a display device 13 such as a display connected to the microcomputer 7.

Figure 5A:
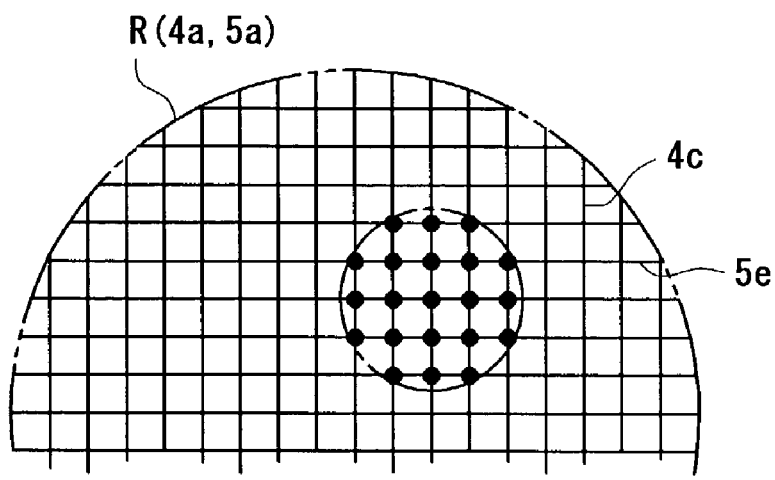
FIGS. 5A, 5B, and 5C are diagrams for explaining control operations of the pointing device of FIG. 1.
Figure 5B:
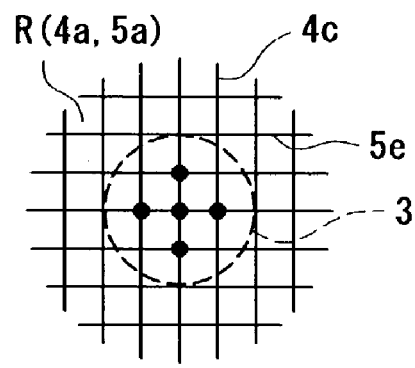

Multiple operation points (black circles in the figures are operation points) are formed as shown in FIG. 5A in the case where the electrode patterns 4c and 5e contact in a plurality of locations in the coordinate operation region R, that is, in the case where there are multiple points of contact, in response to size differences in the operation press force, the size of a finger applying the operation press force, or the like, and therefore, the operation point for performing the coordinate operation becomes unclear. The operation point setting program 8 of this embodiment sets one operation point within a region of multiple contacts in the case where there are multiple contact points as described above. For example, as the operation point to be set, the centroid contact point can be set, an operation point other than the centroid contact point can be set, and in the case where two adjacent conductive wires come into contact with each other, although in practice a contact point does not exist, but a point between both of the thin conducting wires can be set as the operation point. In the case where the centroid contact point is set as the operation point, the number of conductive wires forming the multiple contacts are each counted by the electrode pattern 4c and the electrode pattern 5e, and a center line thereof may be specified. Further, a specific example of setting the operation point at a contact point other than the centroid contact point is explained in Embodiment 2 discussed later.

The invalidation control program 9 of this embodiment is one that invalidates coordinate operation at the time when the input operation performed by the switching portion 3 is conjectured. If this is not done, for example, if coordinate operation is effective in the case where a selecting element displayed in a screen by a pointer is placed in an indicated state by the coordinate operation, and an attempt is made to select this by the input operation, then there is a case where when the indicated position of the pointer deviates with the operation press force due to the input operation, which leads to erroneous operation. In order to prevent this type of inconvenience, the invalidation control program 9 determines that the input operation is being performed by the switching portion 3 in the case where there are multiple points of contact between the electrode patterns 4c and 5e at locations vertically above the switching portion 3 (cases in which five operation points shown by black circles are formed in the example shown in the figure), and control for invalidating the coordinate operation is performed.

Figure 5C:
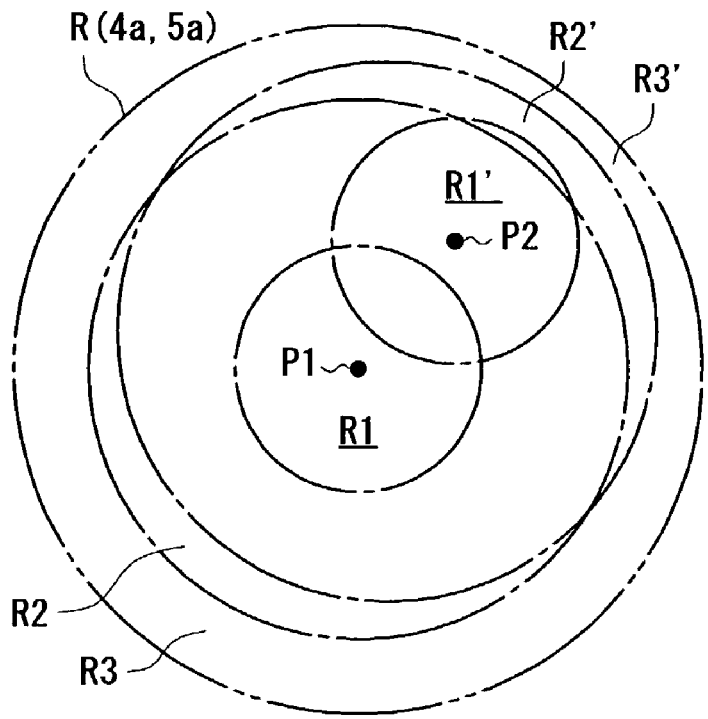

The speed control program 10 is a program for setting an arbitrary operation point within the coordinate operation region R as an operation starting point, and the movement speed imparted to the operation object element is made faster or slower. The operation object element may include, but is not limited to, an indication sign such as a pointer or a cursor, a scrolling screen, or the like. The speed control program 10 performs coordinate operation corresponding to the distance at which the operation point is separated outward from the operation starting point. The Coordinate operation of the operation object element becomes possible with an analog operation feel. Moreover, operability and operation efficiency can be greatly increased. For example, if the speed control program 10 sets an operation point P1, which is the center of the coordinate operation region R, as the operation starting point as shown in FIG. 5C, then speed setting at a low speed region R1, an intermediate speed region R2, and a high speed region R3 is performed for each operating point capable of being formed within the coordinate operation region R. Further, if an operation point P2 that is separated from the center of the coordinate operation region R is set as the operation starting point, then the speed control program 10 performs setting of the speed regions eccentrically like a low speed region R1', an intermediate speed region R2', and a high speed region R3' in each operation point. Note that the speed settings need not be stepwise at low speed, intermediate speed, and high speed, and the speed can be set to gradually become faster with the separation distance from the operation starting point increasing outward. The aforementioned eccentric speed regions need not be set, and the setting of concentric circle shaped speed regions, centered on the operation point P2, can also be performed.

The direction control program 11 is a program for setting the movement direction of the operation object element for each operation point formed by conductive contact between both of the electrode patterns 4c and 5e in the coordinate operation region R. Specifically, the direction control program 11 sets the operation point P1 shown in FIG. 5C as a coordinate operation reference point, for example, and sets the movement direction of each of the operation points with the operation point P1 as a center. Further, the operation point P2 can also be set as the coordinate operation reference point, and the movement direction of each operation point can be set with the operation point P2 as a center.

The operation mode switching program 12 of this embodiment changes the coordinate operation performed by coordinate operation portion 2 to another input operation mode in order to implement each type of function provided to the equipment to which the pointing device 1 is mounted. Specifically, if input of the switching portion 3 is detected, the operation mode switching program 12 changes the coordinate operation performed by continuity between both of the electrode patterns 4c and 5e of the operation substrate 4 and the base substrate 5 to a predetermined input operation mode. Note that a specific operation example implemented by the operation mode switching program 12 is discussed further below.

An operation example of this embodiment is explained below.

Actions for moving a pointer displayed in a liquid crystal display that forms the display device 13, and selecting an icon displayed in the liquid crystal display, by utilizing the pointing device 1 of this embodiment as a pointing device of a notebook type personal computer, a PDA, or a portable telephone is explained.

Pointer movement actions in this first operation example are made by performing a pressing spherical surface operation similar to a spherical surface operation imparted to a track ball. That is, an operation is performed by rubbing while applying an operation press force to the spherical shaped dome-shaped coordinate operation portions 4a and 5a that makes both of the electrode patterns 4c and 5e conductive. It is thus possible to artificially achieve the superior operation feel that is characteristic of the trackball operation with the pointing device 1 of this embodiment, and superior operability can be displayed.

Specifically, the operation press force is first applied to an arbitrary location of the coordinate operation portion 2. Accordingly, the flexible operation substrate 4 deforms into a concave shape, and its electrode pattern 4c comes into contact with the electrode patterns 4c and 5c of the base substrate 5. An operator can therefore perform an operation while tactually perceiving the deformation, in which the operation substrate 4 deforms into a concave shape, by a finger that performs the operation.

The operation point setting program 8 sets the contact point between both of the electrode patterns 4c and 5e as the operation starting point. Note that the centroid contact point is set as the operating starting point as described above in this embodiment in the case where multiple contacts are formed as discussed above. Anyone can therefore perform accurate operation because the operation starting point is substantially fixed, even if there are discrepancies in the force adjustments of the operation press force, in which differences appear depending upon the operator, differences in the finger size depending upon the operator, and the like.

With the operation press force at the start of the coordinate operation continuing to be applied, the operation point is moved from the operation starting point toward the direction at which the icon is displayed on the display. That is, a pressing spherical surface operation similar to those of trackball operation discussed above are performed. At the time of this movement, the operation substrate 4 that has deformed into a concave shape by the operating press force at the start of the coordinate operation moves along with the movement of the operation point. Therefore, the operator can also perform operation while tactually perceiving, by finger, that the concave shaped shape-changed location of the operation substrate 4 is moving along with the pointer movement.

If the operation point is moved here in a rightward direction, then the pointer moves in the rightward direction following the movement of the operation point, namely finger movement. The pointer also moves similarly for movement toward the upward, downward, and leftward directions.

When the pointer indicates the operation object icon, an operation for selecting this icon is then performed. To perform the selection operation, an operation press force further larger than the one applied in order to perform the current coordinate operation may be applied as it is. Therefore, the operator may perform the selection operation as it is, without removing the finger performing the operation, when transferring from a coordinate operation to a selection operation, and therefore, it is not necessary to perform other key operations. Thus, the operability is extremely good.

If the aforementioned further large operation press force is applied, then the operation press force is reliably transmitted to the switching portion 3 through the base substrate 5 and the resin spacer 5c bonded to the rear surface of the base substrate 5, no matter where the operation point position in the coordinate operation region R is located. The metallic conical spring contact 6b therefore buckles along with a "click" sound clicking sensation. The conical spring contact 6b thus makes conductive contact with the contact 6c of the substrate 6a, and selection operation input is performed. The operator can therefore perform a reliable selection operation by perceiving the "click" sound clicking sensation of the conical spring contact 6b.

An operation for confirming the icon selection is then performed after the selection operation. As to the confirming operation, like a double clicking operation performed by a mouse device, the operation press force is temporarily removed, and another large operation press force is applied, thus performing the input operation of the switching portion 3. The operation for confirming the selection of the icon is thus performed.

Note that it is also possible to perform an icon dragging operation or a dropping operation without performing these confirming operations. In the case of performing a dragging operation, coordinate operations performed in substance by a pressing spherical surface operation similar to that of the aforementioned trackball operation may be once again implemented at the time when the operation for selecting the icon is performed. At the time when the icon has been moved to a predetermined location, an icon dropping operation can be performed provided that an input operation of the switching portion 3 is performed as described above.

A second operation example for moving the pointer and selecting an icon is explained next. Note that explanations of points that are the same as those of the first operation example are omitted.

In the second operation example, the speed control program 10 sets the low speed region R1, the intermediate speed region R2, and the high speed region R3 as speed regions centered about the operation starting point P1, for example, for the operating points contained in the coordinate operation region 2, as shown in FIG. 5C.

Further, the direction control program 11 sets the movement direction for each operation point with the operation starting point P1 as a center in this operation example, as shown in FIG. 5C. For example, in the case where an operation point located on a diagonal sloping at 45° upward and to the right with respect to the operation starting point P1 is formed by conductive contact between both of the electrode patterns 4c and 5e, the pointer moves in the diagonal direction upward and to the right at 45°. Further, in the case where an operation point located on a diagonal sloping at 45° downward and to the left with respect to the operation starting point P1 is formed, the pointer moves in the diagonal direction downward and to the left at 45°. In other words, differently from the aforementioned first operation example, in this operation example, the current position coordinate of the pointer is made to conform to the operation starting point P1 of the coordinate operation region R shown in FIG. 5C. Note that it is not always necessary to make the current position coordinate of the pointer conform with the operation starting point P1, and that it may also be made to conform with the operation starting point P2, and the speed regions R1', R2', and R3' may also be set. However, making the operation starting point P1, which is the center of the coordinate operation region R, conform with the operation starting point P1 has good operability, and therefore, the current position coordinate of the pointer is made to conform with the operation starting point P1 in this operation example.

An additional point of difference between the second operation example and the first operation example is that the movement speed and the movement direction set in each of the operation points is maintained until the continuous conductive contact in each of the operation points is released. For example, in the case where the pointer is moved in a diagonal direction upward and to the right at 45° with respect to the operation starting point P1, shown in FIG. 5C, the pointer continues to move in the diagonal direction upward and to the right at 45° by the operator, who only continues to press a portion of the coordinate operation region 2 located in the diagonal direction upward and to the right at 45° with respect to the operation point P1. The moving pointer then moves at the predetermined low speed in the case where the operation point formed by pressing the pressed portion of the coordinate operation region 2 resides in the low speed region R1, at the predetermined intermediate speed in the case where the operation point resides in the intermediate speed region R2, and at the predetermined high speed in the case where the operation point resides in the high speed region. The coordinate operation for pressing and rubbing the coordinate operation region R like those of the aforementioned first operation example therefore become unnecessary in the second operation example, and the movement operation can be performed further easily.

Further, if a pressing operation so as to straddle each of the speed regions R1, R2, and R3 is applied, then the moving speed of the pointer accordingly changes. The pointer can therefore be positioned accurately at the target location provided that, for example, the coordinate operation region 2 is pressed so that an operation point residing in the high speed region R3 is formed first, making the pointer move at high speed, and then the coordinate operation region 2 is pressed so that an operation point residing in the intermediate speed region R2 or the low speed region R1 is formed immediately before the pointer reaches the target location.

Figure 6:
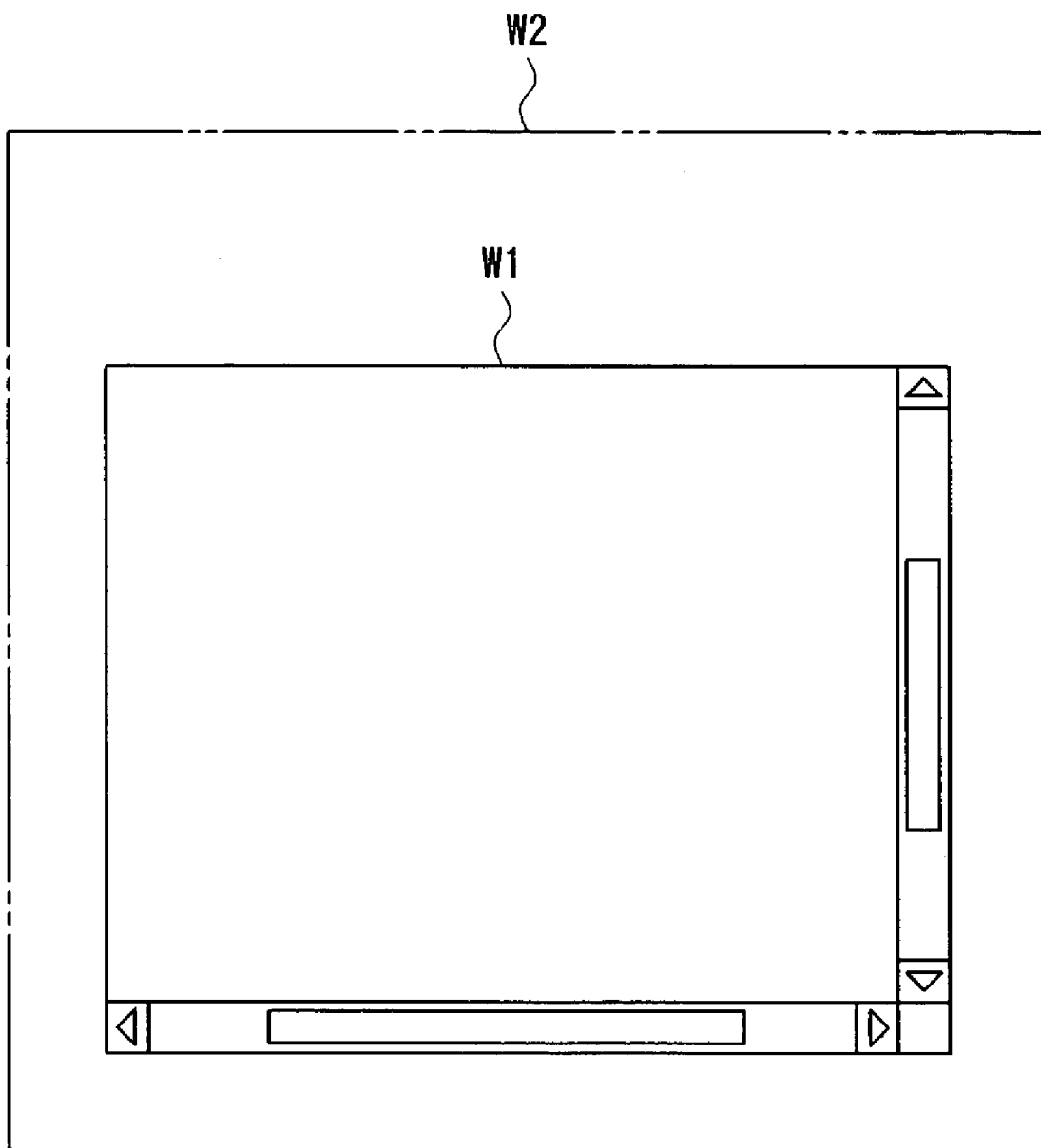
FIG. 6 is a diagram showing a relationship in size between a WEB browser display region and a WEB page frame region.

The screen scrolling operation is explained next as a third operation example. A case in which a browser display region W1 displayed in a liquid crystal display that forms the display device 13 has a larger frame size than a frame size of a WEB page W2, as shown in FIG. 6, is explained here.

An operation for grabbing (selecting operation) the WEB page W2 by the pointer displayed in the display region W1 are performed in this case. In performing the grabbing operation, the input operation of the switching portion 3 is performed by an operation press force, which is further larger than the operation press force for performing a coordinate operation, in the same way as the icon the selection operation in the aforementioned first operation example. The operation point is then made to move from this grabbed state by performing pressing spherical a surface operation similar to those of the trackball operation in the aforementioned first operation example. That is, the WEB page W2 can be scrolled by moving the operation point upward and downward, and to the left and the right, and frame portions not shown in the browser display region W1 can be displayed. The entire WEB page W2 can therefore be inspected with extreme efficiency. Note that the WEB page W2 can also be scrolled by a coordinate operation similar to those of the second operation example.

It is also possible to perform the scrolling operation of the WEB page W2 by a pressing spherical surface operation similar to those of the aforementioned trackball operation, even if the scrolling amount of the WEB page W2 is large, but the operation can be performed further efficiently in the case where the scrolling amount is large by performing the following the scrolling operation. That is, the speed controlling means 9 first sets the operation starting point in the coordinate operation region R with this operation. Here, as an example of the operation starting point to be set, pressing operation point P1 shown in FIG. 5C is set as the operating starting point the low speed region R1, the intermediate speed region R2, an the high speed region R3 are then set in order corresponding to the distance separated from the operation starting point P1. If the coordinate operation region R is then pressed toward a desired scrolling direction, scrolling is performed at the speed of the speed regions R1, R2, and R3 that is set in the pressing operation point. Therefore, if the scrolling amount is large, for example, operation is performed so that the pressing operation point residing in the high speed region R3 is detected at the beginning, and when intended to approach the display target location, the operation point is then moved from the high speed region R3 to the intermediate speed region R2 and the low speed region R1. It is thus possible to realize an effective scrolling operation, and this is extremely useful when particularly a large scrolling operation is necessary. Note that, as stated above, it is not always necessary that the operation starting point be the pressing operation point P1 located in the center of the coordinate operation region R when the speed controlling means 9 sets the operation starting point; an arbitrary operation point pressed by the operator, the pressing operation point P2 of FIG. 5C, for example, may also be set as the operation starting point.

Movement of the pointer and scrolling of the WEB page W2 become the main operation with general WEB pages as explained above, but the following actions can also be performed by the pointing device 1 of this embodiment. For example, in the case where a three dimensional structure object is displayed in the display screen of the display device 13, the three dimensional structure object can be rotationally displayed and the entire object can be observed, the display magnification of the three dimensional structure object can be changed by expanding and contracting, and the viewpoint can be changed by parallel movement, which are extremely useful. It is possible for the pointing device 1 to achieve these operations as follows.

In the case of performing a coordinate operation in order to rotationally display the three dimensional structure object, a pressing spherical surface operation similar to the trackball operations in the first operation example may be performed. A solid body feel for the three dimensional structure object, and a solid body feel for the spherical surface shaped dome-shaped coordinate operation portions 4a and 5a are therefore matched by feel during the operations, with the result that an extremely superior operation feel can be achieved.

An input operation to the switching portion 3 is performed in the case where it is intended to blow-up and display the three dimensional structure object. The operation mode switching program 12 switches the coordinate operation portion 2 from coordinate operation, namely from the rotational display mode, to input operation, namely to a display magnification changing mode, by a pressing spherical surface operation similar to a trackball operation. Specifically, if an input of the switching portion 3 is formed, then a portion of an upper half of the coordinate operation region R is set as an operation region making the display magnification of the three dimensional structure object larger, and if both of the electrode patterns 4c and 5e comes into contact in this region and the contact point is detected, then the three dimensional structure object is blown up and displayed. On the other hand, a portion of a lower half of the coordinate operation region R is set as an operation region that reduces the display magnification, and the three dimensional structure object is reduced and displayed if contact point detection occurs in this region. Note that rotational display of the three dimensional structure object by the coordinate operation portion 2 becomes impossible at this time.

In addition, in order to make the viewpoint move parallel from the three dimensional structure object to another adjacent three dimensional structure object, the operation mode switching means 10 switches the coordinate operation portion 2 from coordinate operation (rotational display mode) or input operation (display magnification changing mode) to parallel movement mode as another input operation if the switching portion 3 detects a double click, for example. If the mode is switched to the parallel movement mode, then a portion of a right half portion of the coordinate operation region R is set as an operation region for making the viewpoint move toward the right, for example, and a portion of a left half portion is set as an operation region for making the viewpoint move toward the left. The viewpoint can then be moved parallel corresponding to each of the operation regions.

Figure 7:
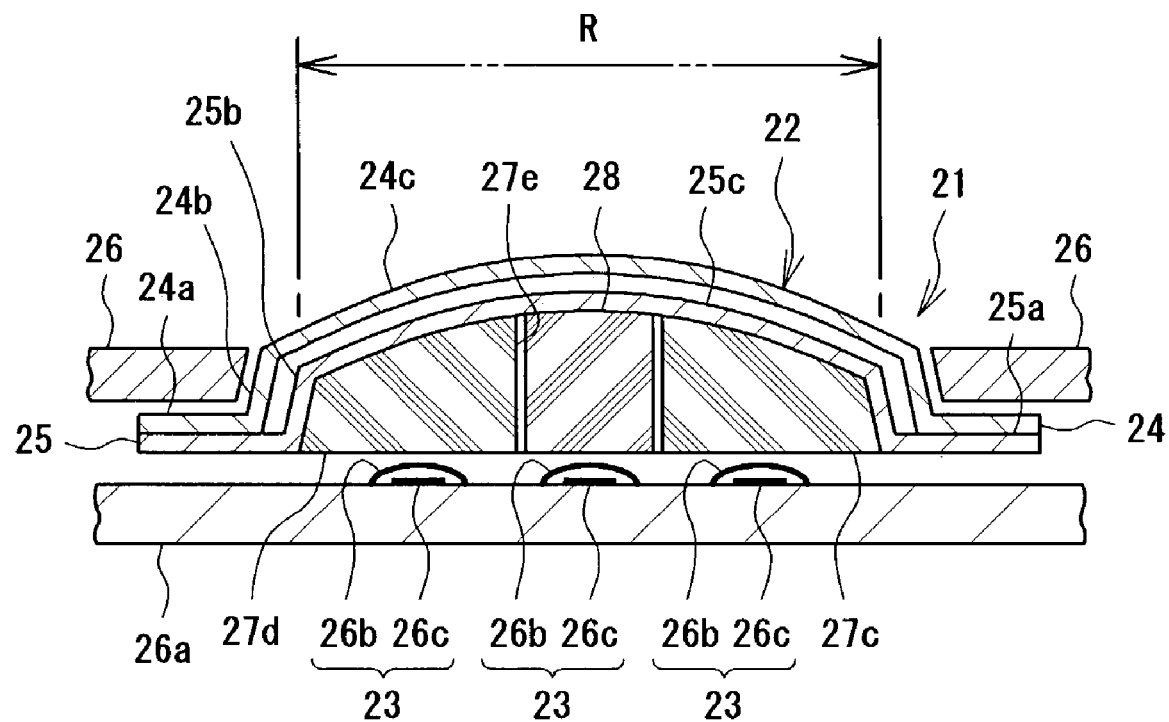
FIG. 7 is a cross sectional diagram taken along the line DB-DB of FIG. 8, for showing a pointing device in accordance with Embodiment 2 of the present invention.
Figure 8:
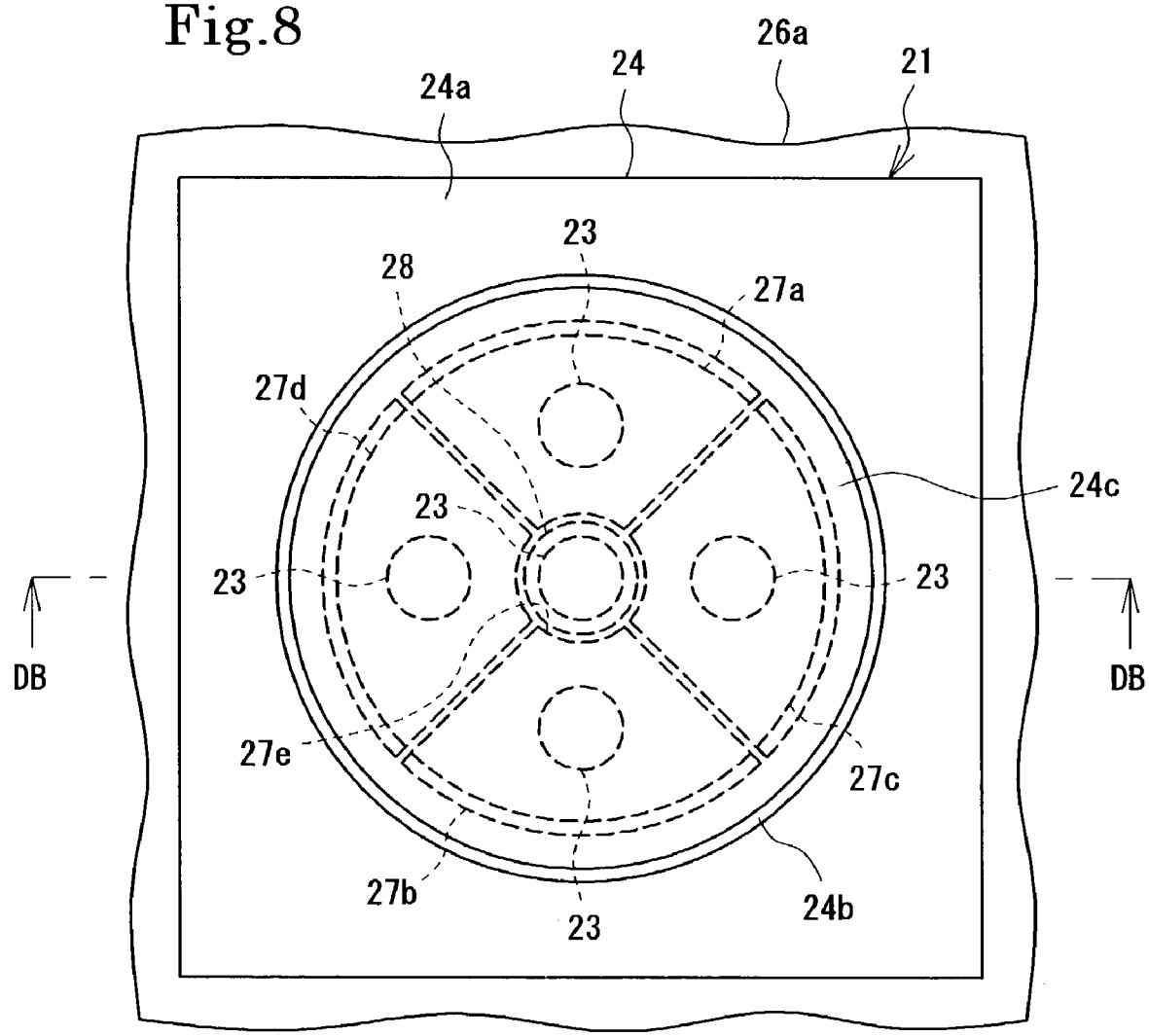
FIG. 8 is a plan view of the pointing device of FIG. 2.
Figure 9:
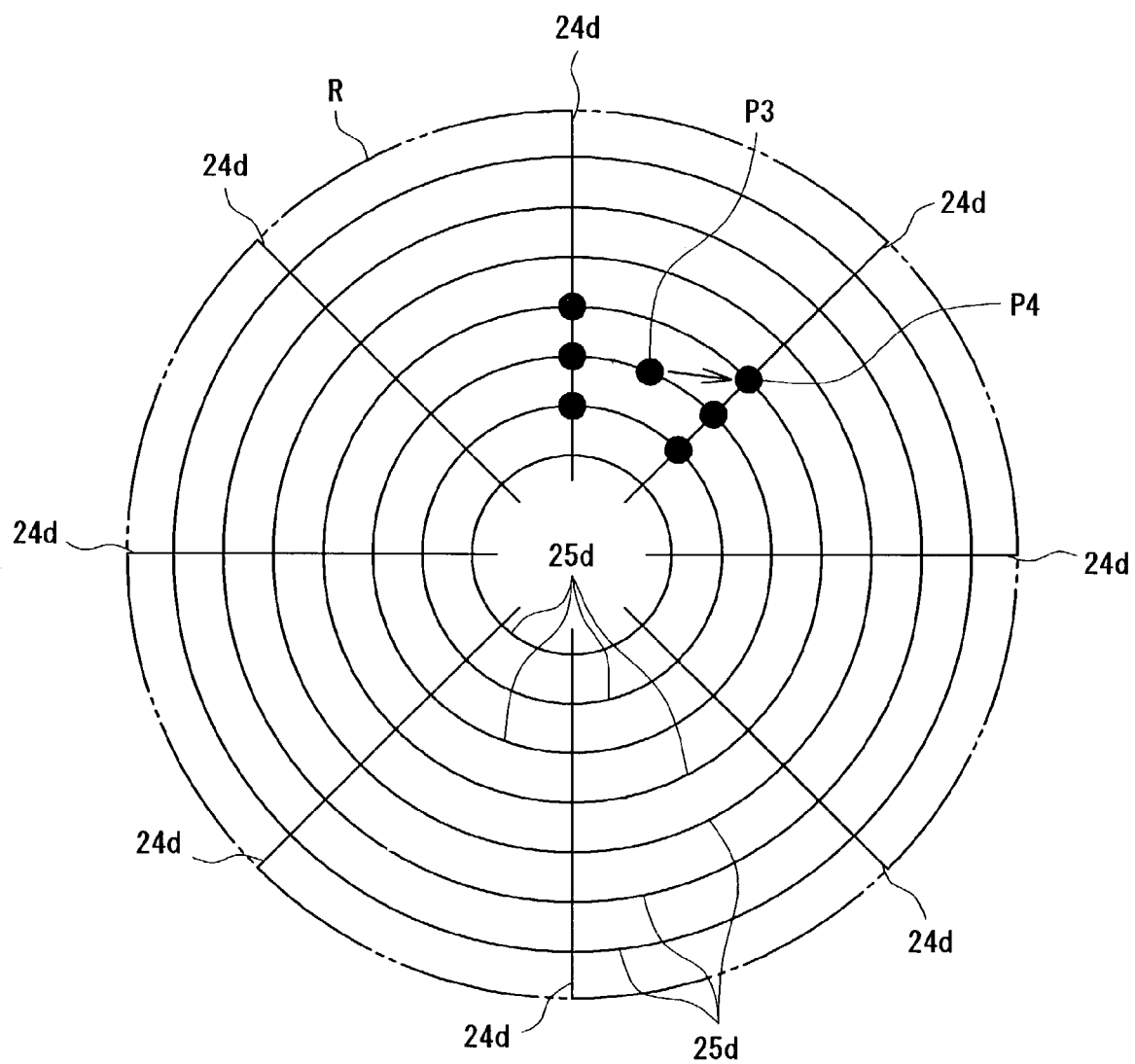
FIG. 9 is an explanatory diagram showing an electrode pattern of a coordinate operation region of the pointing device of FIG. 7.

Embodiment 2 (FIG. 7 to FIG. 9)

A pointing device 21 of this embodiment is also provided with a coordinate operation portion 22 and a switching portion 23, similar to Embodiment 1.

However, surrounding walls 24b and 25b that rise up from flat general surfaces 24a and 25a are formed in an operation substrate 24 and a base substrate 25 of the coordinate operation portion 22, respectively, of this embodiment. The height of the surrounding walls 24b and 25b is set to a height that corresponds to the thickness of a frame 26 of an equipment in which the pointing device 21 is mounted. Dome-shaped coordinate operation portions 24c and 25c are formed on the surrounding walls 24b and 25b, providing a coordinate operation region R.

Resin spacers 27a to 27d and 28 that have upper surface shapes which correspond to surface shapes of a rear surface of the dome-shaped coordinate operation portion 25c of the base substrate 25 are provided in a bonded state to the rear surface. The resin spacers 27a to 27d and 28 of this embodiment are composed of a ring-shape circumferential spacer 27 and the central spacer 28, and the ring-shaped circumferential spacer 27 is formed as a divided body composed of a plurality of portions aligned in the circumferential direction. Specifically, an upper side portion 27a, a lower side portion 27b, a right side portion 27c, and a left side portion 27d are present. A cylindrical-shaped guide hole 27e that passes through in an upward and downward direction is formed in the center of the ring-shaped circumferential spacer 27, and the central spacer 28 passes through the guide hole 27e in an upward and downward movable state.

Switching portions 23 are provided under each of the side portions 27a to 27d of the circumferential spacer 27 and the central spacer 28. Each of the switching portions 23 is structured by a metallic coned disk spring contact 26b that is surface-mounted to an internal substrate 26a in the frame of the equipment, and a contact 26b of the substrate 26a, and there is conductive contact with the contact 26b by the conical spring contact 26b buckling due to pressing. The input operation can thus be performed. A maximum of five different input operations can therefore be performed by the pointing device 21 of this embodiment, and additional multi-functionality can thus be achieved. Note that, among the five switching portions 23, the switching portion 23 below the central spacer 28 corresponds to the switching portion 3 of Embodiment 1, and the four switching portions 23 below the circumferential spacers 27a to 27d structure "other switching portions".

Electrode patterns 24d and 25d, formed in the operation substrate 24 and the base substrate 25 of this embodiment, respectively, are explained here. As shown in FIG. 9, the electrode patterns 24d are formed in radiant line shapes from the center of the coordinate operation region R in the operation substrate 24 in the coordinate operation region R, while the electrode patterns 25d are formed in multiple concentric circle shapes from the center in the base substrate 25. Operation directions are detected by the radiant line-shaped electrode pattern 24d. Regarding the detection of the operation direction, a total of 8 radiant line-shaped electrode patterns 24d are formed in the example shown in the figure and 8 direction detection is of course possible. However, if pressing operation forces act simultaneously on adjacent electrode patterns 24d and the contact is formed for each of the patterns, the center between the two points is taken, thereby being capable of detecting a maximum of 16 directions becomes possible. Further, the speed of the operation object element is detected by the multiple concentric circle-shaped electrode patterns 25d. Specifically, it is possible for the speed control program 11 to set the movement speed of the operation object element, a pointer for example, to gradually increase from the center electrode pattern 25d toward the outer electrode pattern 25d. Further, it is also possible to perform a coordinate operation by a pressing spherical surface operation, similar to a trackball operation, as explained in the first operation example of Embodiment 1. A coordinate operation is performed by the pointing device 21 of this embodiment by utilizing such electrode patterns 24d and 25d.

Note that, for cases in which the electrode patterns 24d and 25d have multiple points of contact during the coordinate operation, the centroid of the points may detected similarly to Embodiment 1, and the centroid may be set as the operation point, and the operating point setting means 7 of this embodiment performs operation point setting as follows.

For example, as shown in FIG. 9, assume that there are brought into multiple points of contact in six locations by two electrode patterns 24d and three electrode patterns 25d coming into contact. In this case the centroid of the points is simply detected in Embodiment 1, and then set as the operation point, and therefore the operation point to be set is the point P3. Surprisingly, however, there are cases in which this point does not coincide with the operation feel of the operator if the operation point P3 is set in this manner. That is, the coordinate operation region R is generally formed as a dome shape, and therefore the dome shape coordinate operation portions 24c and 25c become surfaces inclined downward from the vertex. The downward inclined surfaces act to cause an illusion to the operator. In other words, with the operator's operation feel, there is a case where when the actual intention is to press a location upward and to the right of the operation point P3, which becomes the centroid, and the operation point P3 to be set does not coincide with the operator's operation feel in many cases. This is considered to be due to an illusion resulting from the downward inclined surfaces, and this operation feel disagreement is eliminated in this embodiment as follows.

Specifically, the coordinate operation region R is divided into an upper right region, an upper left region, a lower right region, and a lower left region, and an operation point P4 located more upward and to the right within the figure than the centroid is set for cases in which the operation point is in the upper right region (cases in the example shown in FIG. 9). Similarly to this, an operation point located more upward and to the left within the figure than the centroid is set for cases in which the operation point is in the upper left region. An operation point located more downward and to the right than the centroid within the figure is set for cases in which the operation point is in the lower right region, and an operation point located more downward and to the left than the centroid within the figure is set for cases in which the operation point is in the lower left region. For the coordinate operation region R that has become an inclined surface, disagreement in operation feel between the operator's operation feel and the operation point P4 actually set is eliminated with the operation point setting means 7 of this embodiment by performing offset correction of the operation point setting so that the operation point is set in a position on the lower side of the incline direction in the pressing location, and on the outside of the operation direction.

Other Embodiments (FIG. 10 to FIG. 13)

In addition to the pointing devices 1 and 21 of Embodiment 1 and Embodiment 2 above, pointing devices with cross sectional shape coordinate operation portions like those shown in FIG. 10 to FIG. 13, for example, can also be made. Note that the planar shapes of these pointing devices are all circular.

Figure 10:
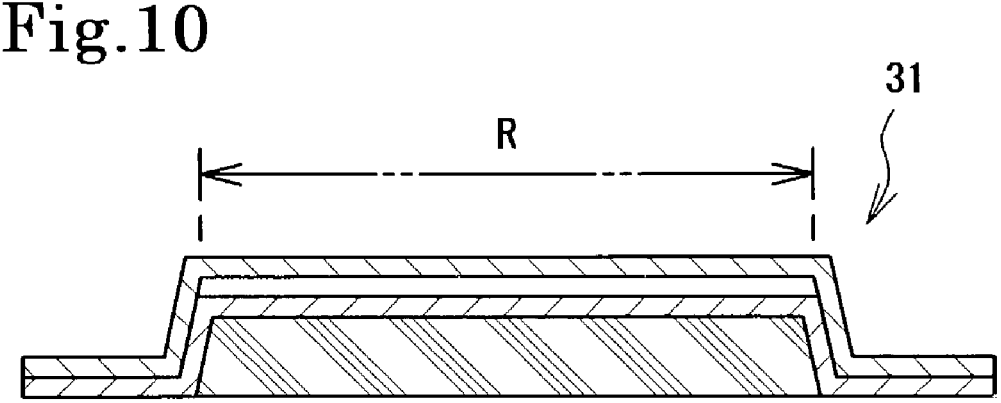
FIG. 10 is a cross sectional diagram of a pointing device in accordance with Embodiment 3 of the present invention.

First, a pointing device 31, of which only a coordinate operation portion is shown in FIG. 10, is one having a flat plane shape as its coordinate operation region R. This can also demonstrate similar actions and effects as those of the aforementioned embodiments.

Figure 11:
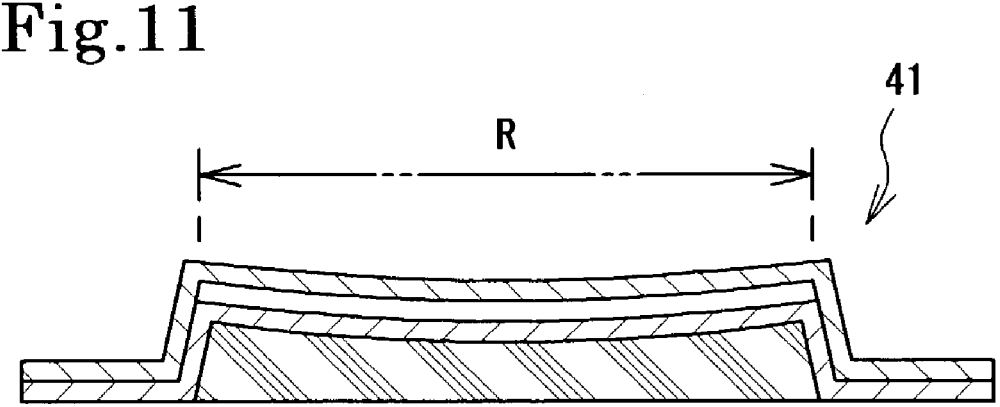
FIG. 11 is a cross sectional diagram of a pointing device in accordance with Embodiment 4 of the present invention.

A pointing device 41, of which only a coordinate operation portion is shown in FIG. 11, is one in which the coordinate operation portion R is given a concave curved shape. This is a shape that is the opposite of the dome-shaped coordinate operation portions 24c and 25c of Embodiment 2. This can also demonstrate similar actions and effects as those of the aforementioned embodiments.

Figure 12:
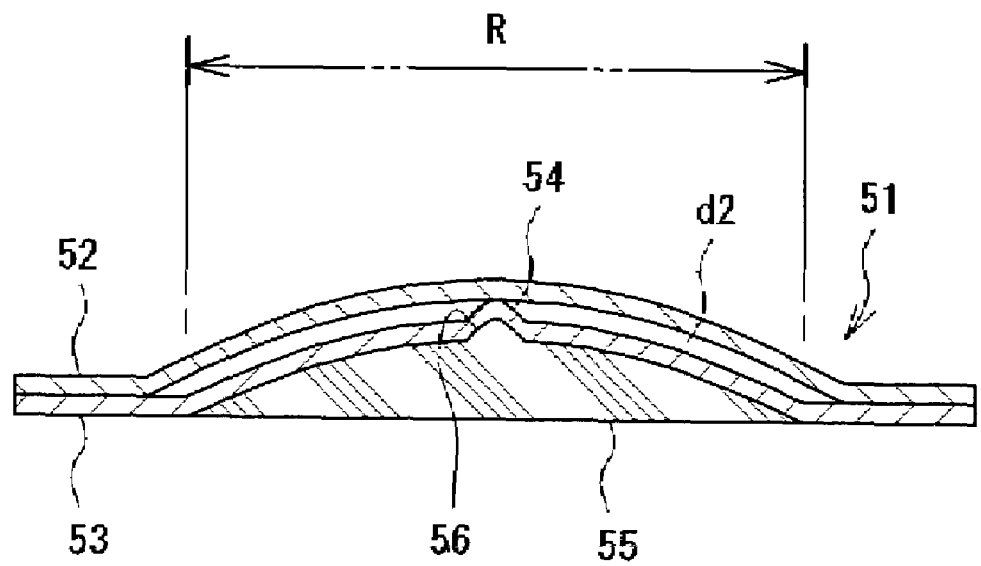
FIG. 12 is a cross sectional diagram of a pointing device in accordance with Embodiment 5 of the present invention.

A pointing device 51, of which only a coordinate portion is shown in FIG. 12, is one in which a supporting protrusion portion 54 that maintains a gap d2 is formed in a base substrate 53 in a non-formed portion of an electrode pattern in the coordinate operation regions R of an operation substrate 52 and the base substrate 53. A supporting protrusion portion 56 corresponding to the supporting protrusion portion 54 is also formed in a resin spacer 55. The gap d2 can be maintained over a long period of time by the supporting protrusion portions 54 and 56, even if they repeatedly receive an operation press force. Note that, although an example in which one each of the supporting protrusion portions 54 and 56 are formed is shown in the figure, a plurality of them may also be formed to support the operation substrate 52 at multiple points and maintain the gap d2. This can also demonstrate similar actions and effects as those of the aforementioned embodiments.

Figure 13:
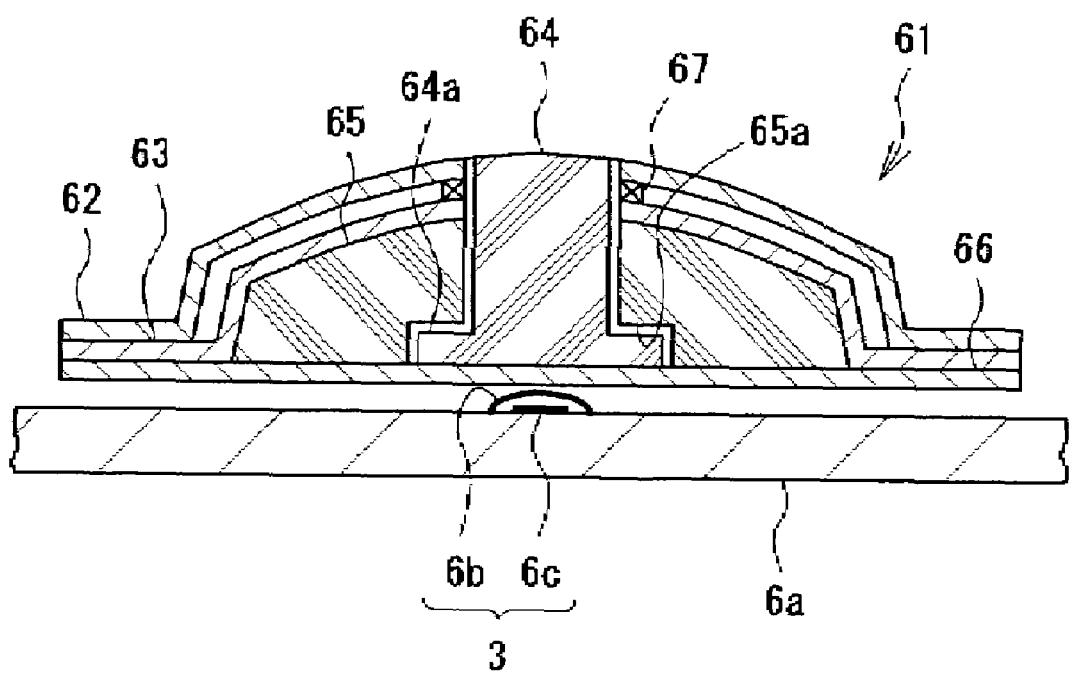
FIG. 13 is a cross sectional diagram of a pointing device in accordance with Embodiment 6 of the present invention.

A pointing device 61 in FIG. 13, is an example of a variation of Embodiment 2, and is one in which a central spacer 64 is formed so as to penetrate through an operation substrate 62 and a base substrate 63. A latching flange 64a that protrudes in a ring shape toward the outside is formed in a lower edge of a central spacer 64, and latched by a latching step portion 65a formed in a cutout shape in an endless ring-shaped circumferential spacer 65. Reference numeral 66 denotes a waterproof and dust-proof sheet material, and is joined to the base substrate 63. A ring shape supporting portion 67 is formed between the operation substrate 62 and the base substrate 63, and the operation substrate 62 is supported from its rear surface side by the ring shape supporting portion 67. An upper surface of the center operation portion 64 is exposed to the outside by using the pointing device 61, and the input operation becomes even easier to perform. Further, this can also demonstrate similar actions and effects as those of the aforementioned embodiments.

In addition to what is shown in FIG. 10 to FIG. 13, the coordinate operation region may also have a polygonal shape or an elliptical shape as its planar shape. In particular, display screens of display devices of all types of equipment are mostly rectangular in shape, and therefore operability can be further increased if a shape corresponding to the display screen is formed.

INDUSTRIAL APPLICABILITY

An input operation device having suitable tactile operability as an electric man-machine interface, and having multi-functionality capable of corresponding to highly functional electrical equipment, can be realized in accordance with the present invention as explained above.

What is claimed is:

1. An input operation device comprising:
  a coordinate operation device including an operation substrate and a base substrate, the operation substrate having an operation conductive coordinate detection portion, the base substrate having a base conductive coordinate detection portion, the operation conductive coordinate detection portion and the base conductive coordinate detection portion being separated by a gap;
  a switching device including a first contact and a second contact, and a resin spacer between the coordinate operation device and the switching device,
  wherein the operation conductive coordinate detection portion has electrode patterns oriented in a first direction, and the base conductive coordinate detection portion has electrode patterns oriented in a direction other than the first direction,
  wherein upon deformation of the operation substrate:
  the operation conductive coordinate detection portion is adapted to contact the base conductive coordinate detection portion, and
  the first contact is adapted to contact the second contact, and
  further comprising an invalidation control device that invalidates a coordinate operation if multiple operation points are formed by the coordinate detection portion of the operation substrate and the coordinate detection portion of the base substrate contacting at a vertical upper position of the switching device due to a pressing operation.

2. An input operation device comprising:
  a coordinate operation device including an operation substrate and a base substrate;
  a switching device including a first contact and a second contact, the base substrate being between the operation substrate and the switching device; and
  a resin spacer between the coordinate operation device and the switching device,
  wherein the operation substrate has an operation conductive coordinate detection portion, a first electrode pattern being on the operation conductive coordinate detection portion,
  wherein the base substrate has a base conductive coordinate detection portion, a second electrode pattern being on the base conductive coordinate detection portion, and
  wherein, upon deformation of the operation substrate, the first electrode pattern is adapted to contact the second electrode pattern and the first contact is adapted to contact the second contact, and
  further comprising an invalidation control device that invalidates a coordinate operation if multiple operation points are formed by the coordinate detection portion of the operation substrate and the coordinate detection portion of the base substrate contacting at a vertical upper position of the switching device due to a pressing operation.

3. An input operation device according to claim 2, wherein the operation conductive coordinate detection portion and the base conductive coordinate detection portion are separated by a gap.

4. An input operation device according to claim 2, wherein the first electrode pattern is oriented in a first direction, and the second electrode pattern is oriented in a direction other than the first direction.

5. An input operation device according to claim 2, wherein a clicking sensation is generated upon deformation of the operation substrate.

6. An input operation device according to claim 2, wherein the operation conductive coordinate detection portion is dome-shaped, and the base conductive coordinate detection portion is dome-shaped, the radius of curvature of the base conductive coordinate detection portion being smaller than that of the operation conductive coordinate detection portion.

7. An input operation device according to claim 2, wherein the operation conductive coordinate detection portion is joined to the base conductive coordinate detection portion.

8. An input operation device according to claim 2, wherein the first electrode pattern includes a plurality of electrodes.

9. An input operation device according to claim 2, wherein the second electrode pattern includes a plurality of electrodes.

10. An input operation device according to claim 2, wherein the resin spacer having an upper surface portion that conforms to a surface shape of the rear surface of the base substrate.

11. An input operation device according to claim 10, wherein the resin spacer includes a circumferential spacer, a guide hole being within the circumferential spacer.

12. An input operation device according to claim 11, wherein a central spacer passes through the guide hole.

13. An input operation device according to claim 11, wherein the switching device is disposed below the central spacer.

14. An input operation device according to claim 11, further comprising:
    another switching device below the circumferential spacer, said another switching device being adapted to generate an input signal by the operational pressing through the coordinate operation device.

15. An input operation device according to claim 11, wherein the circumferential spacer is formed as divided bodies composed of a plurality of portions along the circumferential direction.

16. An input operation device according to claim 2, further comprising a direction control device for setting a movement direction of an operation object element for coordinate operation, in an operation point formed by conductive contact between the operation conductive coordinate detection portions and the base conductive coordinate detection portion.

17. An input operation device according to claim 16, wherein the direction control moves, if the operation point is formed, the operation object element in the movement direction set in the operation point until intermittent conductive contact is released in the operation point.

18. An input operation device according to claim 2, further comprising a speed control device for setting a movement speed of an operation object element for coordinate operation, in an operation point formed by conductive contact between the operation conductive coordinate detection portions and the base conductive coordinate detection portion.

19. An input operation device according to claim 18, wherein the speed control device moves, if the operation point is formed, the operation object element at the movement speed set in the operation point until intermittent conductive contact is released in the operation point.

20. An input operation device according to claim 2, further comprising a speed control device for changing a movement speed of an operation object element for coordinate an operation in response to a separation distance from an operation starting point, with the operation point formed by conductive contact between the operation conductive coordinate detection portions and the base conductive coordinate detection portion set as the operation starting point.

21. An input operation device according to claim 2, further comprising an operation point setting device for setting one operation point as an operation starting point if multiple operation points are formed by contact between the operation conductive coordinate detection portions and the base conductive coordinate detection portion.

22. An input operation device according to claim 2, further comprising an operation mode switching device for switching to a predetermined input operation, a coordinate operation that is performed by conductive contact between the operation conductive coordinate detection portions and the base conductive coordinate detection portion, by generating an input signal in the switching device.

23. An input operation device according to claim 2, wherein one of the between the operation conductive coordinate detection portions and the base conductive coordinate detection portion is formed as a vertical-stripe electrode pattern and the other is formed as a horizontal-stripe electrode pattern.

* * * * *